United States Patent
Bernett

(10) Patent No.: US 6,674,608 B1
(45) Date of Patent: Jan. 6, 2004

(54) DAMPED PROTECTIVE COVER TO IMPROVE DISC DRIVE ACOUSTICS

(75) Inventor: Frank William Bernett, Longmont, CO (US)

(73) Assignee: Seagate Technologies LLC, Scotts Valley, CA (US)

(*) Notice: Subject to any disclaimer, the term of this patent is extended or adjusted under 35 U.S.C. 154(b) by 0 days.

(21) Appl. No.: 09/535,091

(22) Filed: Mar. 24, 2000

Related U.S. Application Data

(60) Provisional application No. 60/133,024, filed on May 7, 1999.

(51) Int. Cl.$^7$ ............................................. G11B 17/02
(52) U.S. Cl. ................................................. 360/97.01
(58) Field of Search .................... 360/97.01, 97.02, 360/97.03, 97.04; 369/263

(56) References Cited

U.S. PATENT DOCUMENTS

| | | | | |
|---|---|---|---|---|
| 4,491,888 A | | 1/1985 | Brown et al. ................... 360/97 |
| 5,021,905 A | * | 6/1991 | Sleger ...................... 360/97.02 |
| 5,034,837 A | * | 7/1991 | Schmitz ........................ 360/105 |
| 5,149,048 A | | 9/1992 | Morehouse et al. ......... 248/632 |
| 5,161,770 A | | 11/1992 | Morehouse et al. ......... 248/632 |
| 5,214,549 A | | 5/1993 | Baker et al. .............. 360/97.02 |
| 5,235,482 A | | 8/1993 | Schmitz ................... 360/97.02 |
| 5,282,100 A | | 1/1994 | Tacklind et al. .......... 360/97.02 |
| 5,426,562 A | | 6/1995 | Morehouse et al. ......... 361/685 |
| 5,666,239 A | | 9/1997 | Pottebaum ................ 360/97.03 |
| 5,689,386 A | | 11/1997 | Morehouse et al. ...... 360/97.02 |
| 5,757,580 A | * | 5/1998 | Andress et al. ........... 360/97.02 |
| 5,761,184 A | | 6/1998 | Dauber et al. ............... 369/247 |
| 5,777,821 A | * | 7/1998 | Pottebaum ................ 360/97.02 |
| 5,777,829 A | | 7/1998 | Voldman et al. ............. 360/128 |
| 5,781,373 A | | 7/1998 | Larson et al. ............. 360/97.02 |
| 5,982,580 A | * | 11/1999 | Woldemar et al. ........ 360/97.02 |
| 6,031,686 A | * | 2/2000 | Konno et al. .............. 360/99.01 |
| 6,034,841 A | * | 3/2000 | Albrecht et al. .......... 360/97.01 |
| 6,078,498 A | * | 6/2000 | Eckerd et al. ............... 361/685 |
| 6,081,406 A | * | 6/2000 | Morris et al. ............. 360/97.01 |
| 6,102,379 A | * | 8/2000 | Ponslet et al. ............... 267/136 |
| 6,288,866 B1 | * | 9/2001 | Butler et al. .............. 360/97.01 |
| 6,382,532 B1 | * | 5/2002 | French et al. .............. 239/585.1 |

* cited by examiner

Primary Examiner—Robert S. Tupper
(74) Attorney, Agent, or Firm—Merchant & Gould P.C.

(57) ABSTRACT

A damped PCBA protective cover for reducing acoustic emissions in a disc drive assembly is disclosed. The disc drive assembly comprises a base, a circuit board mounted to the base and a cover fastened to the base and extending over the circuit board. A constrain layer is affixed to the cover that includes a stiffening member and a damping member disposed between the cover and the stiffening member. The constrain layer can be affixed to either side and dampens/absorbs vibrations generated during operation of the disc drive.

19 Claims, 4 Drawing Sheets

DAMPED PROTECTIVE COVER TO IMPROVE DISC DRIVE ACOUSTICS

CROSS REFERENCE TO RELATED APPLICATIONS

This application claims priority to provisional application Ser. No. 60/133,024, filed May 7, 1999, entitled "DAMPED PCBA PROTECTIVE COVER TO IMPROVE ACOUSTICS."

TECHNICAL FIELD

The invention relates generally to disc drives and, more particularly, to a disc drive assembly having a damped protective cover to improve disc drive acoustics.

BACKGROUND

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

Typically, such radial actuators employ a voice coil motor to position the heads with respect to the disc surfaces. The actuator voice coil motor includes a coil mounted on the side of the actuator body opposite the head arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces. The actuator thus allows the head to move back and forth in an accurate fashion between an inner radius and an outer radius of the discs.

Much of the electronics that are essential to the disc drive's operation is mounted on the disc drive's printed circuit board assembly ("PCBA"). The PCBA includes electrical components that manage the operations of the disc drive. For example, the PCBA includes electrical components that control the speed of the spindle and position of the actuator arms over the discs. Similarly, the PCBA also includes electrical components that interface with the computer's processor.

A protective cover may be attached to the disc drive assembly to protect the PCBA from exposure to electrostatic discharge. These protective covers make installation easier and serve to minimize handling damage. However, when a protective cover over the PCBA is used, the protective cover can vibrate and increase the acoustic emissions from the disc drive. As acoustics standards continue to tighten, the overall acoustical emissions from disc drive assemblies must also be reduced. Accordingly, there is a need for improving the acoustic emissions from disc drive assemblies which include a PCBA protective cover.

SUMMARY OF THE INVENTION

The present invention provides solutions to the above and other problems. The disc drive in accordance with the present invention incorporates a damped PCBA protective cover for reducing acoustic emissions in a disc drive. The disc drive assembly comprises a base, a circuit board mounted to the base and a protective circuit board cover fastened to the base and extending over the circuit board. The circuit board is thus disposed between the base and the cover. Furthermore, a constrain layer is affixed to the cover. This constrain layer preferably has a stiffening member and a damping member sandwiched together, although the cover itself may constitute the constrain layer if the material from which the cover is made has the desired damping characteristics. Preferably, the damping member is disposed between the cover and the stiffening member. The stiffening member and the damping member together cooperate to reduce the vibrational and acoustical energy produced by the cover during operation of the disc drive.

The protective cover is a generally flat plate having a first side facing away from the circuit board and a second side facing the circuit board. The constrain layer may be affixed to and sized and configured to correspond to the surface shape of the first side of the cover facing away from the circuit board in one preferred embodiment of the present invention. In an alternative preferred embodiment, the constrain layer may be affixed to and sized and configured to correspond to the surface of the second side of the cover, facing the circuit board. In this alternative embodiment, the constrain layer may include recessed areas that correspond to the location of electrical components mounted on the circuit board.

These and other features as well as advantages that characterize the present invention will be apparent from a reading of the following detailed description and a review of the associated drawings.

BRIEF DESCRIPTIONS OF THE DRAWINGS

Figure 1:
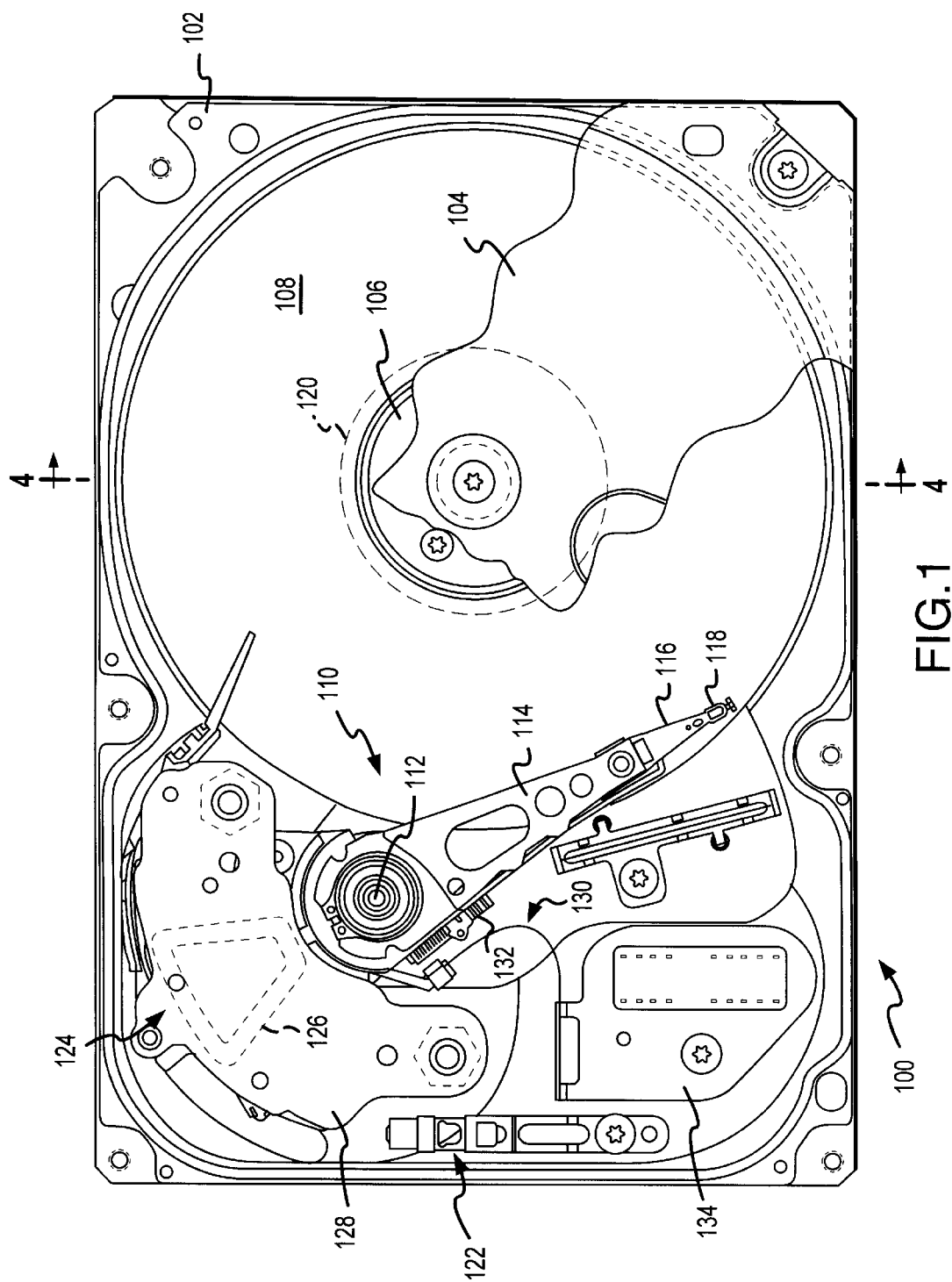
FIG. 1 is a plan view of a disc drive assembly having a damped protective cover in accordance with a preferred embodiment of the present invention with the head disc assembly cover partially broken away.
Figure 2:
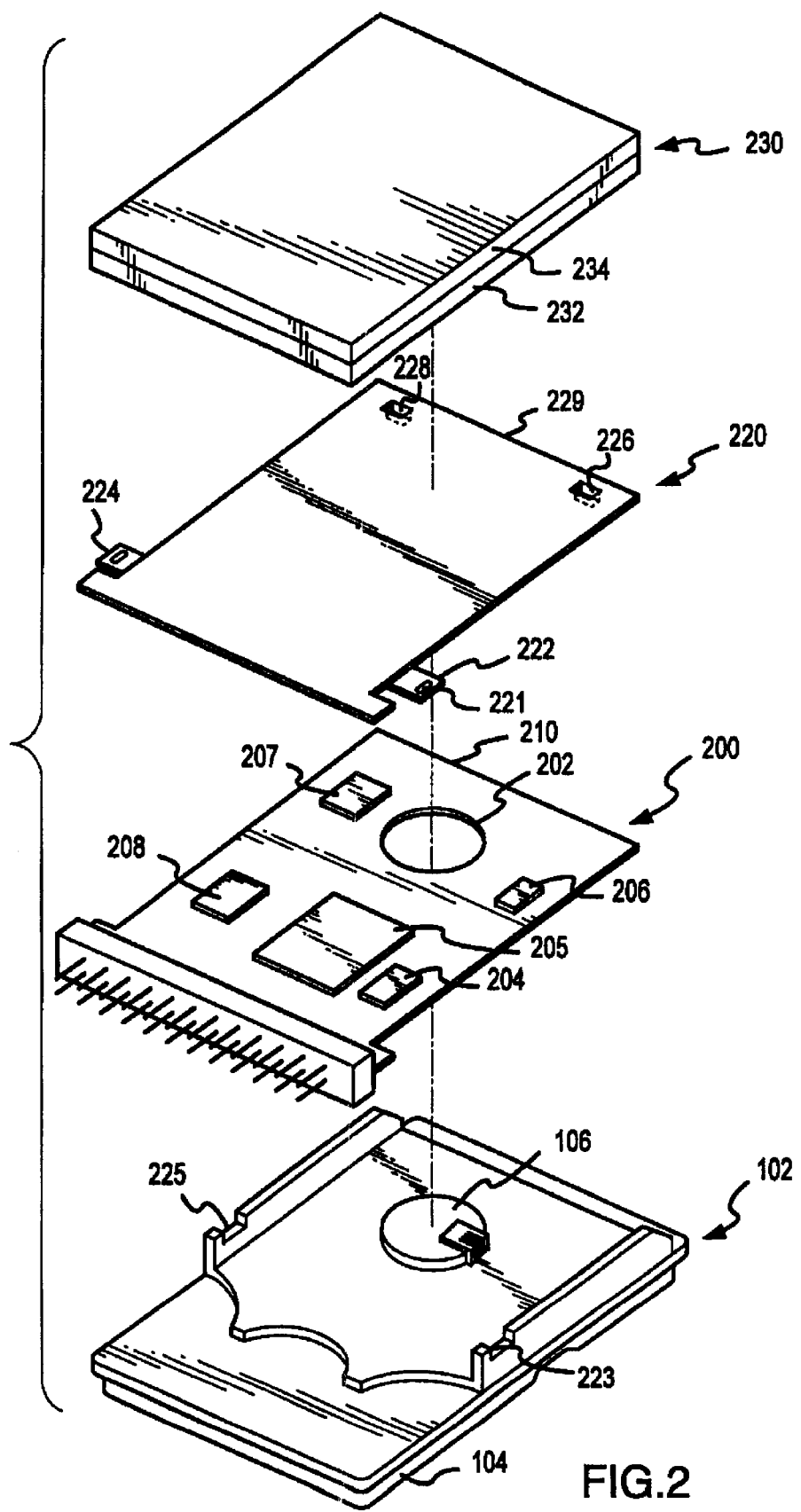
FIG. 2 is an exploded perspective view of the disc drive assembly of FIG. 1 incorporating one preferred embodiment of a damped protective cover in accordance with the present invention.
Figure 3:
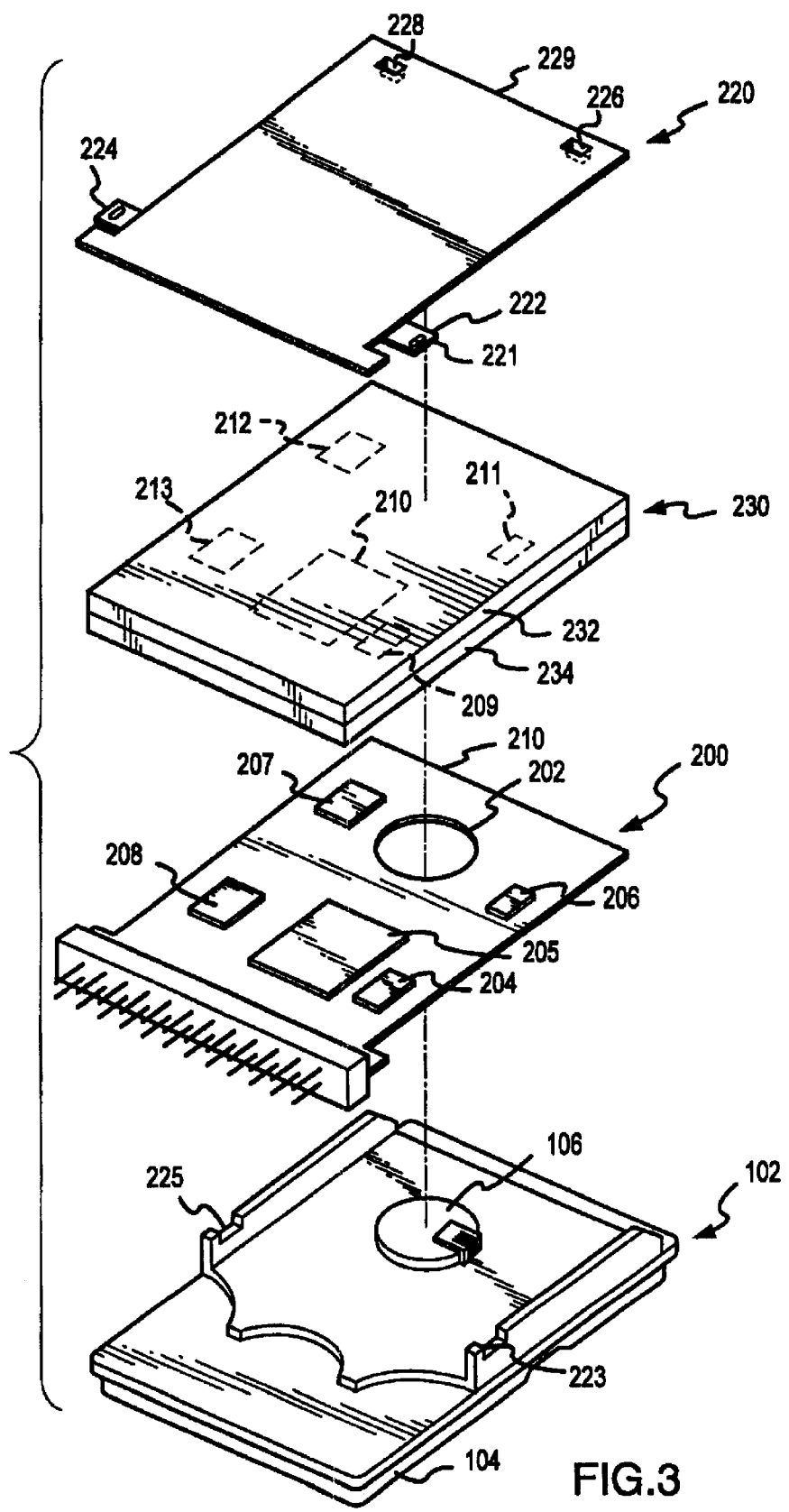
FIG. 3 is an exploded perspective view of the disc drive assembly of FIG. 1 incorporating an alternative preferred embodiment of a damped protective cover in accordance with the present invention.
Figure 4:
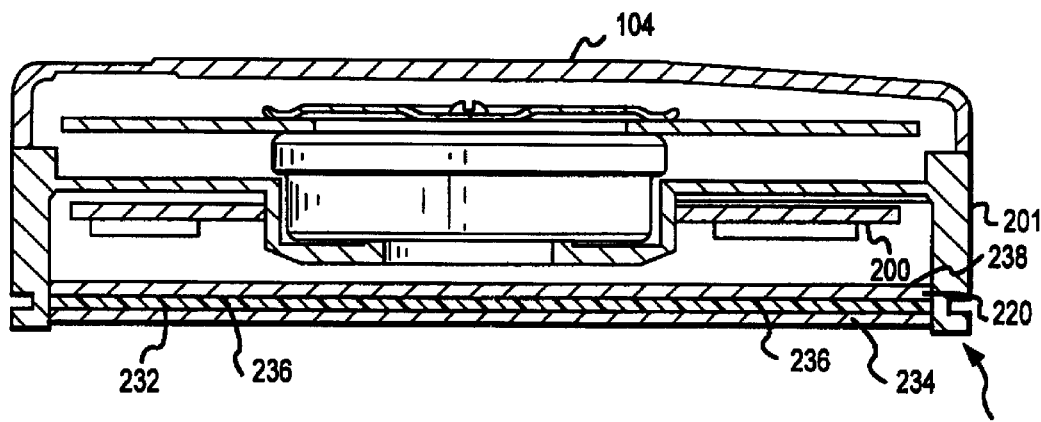
Figure 5:
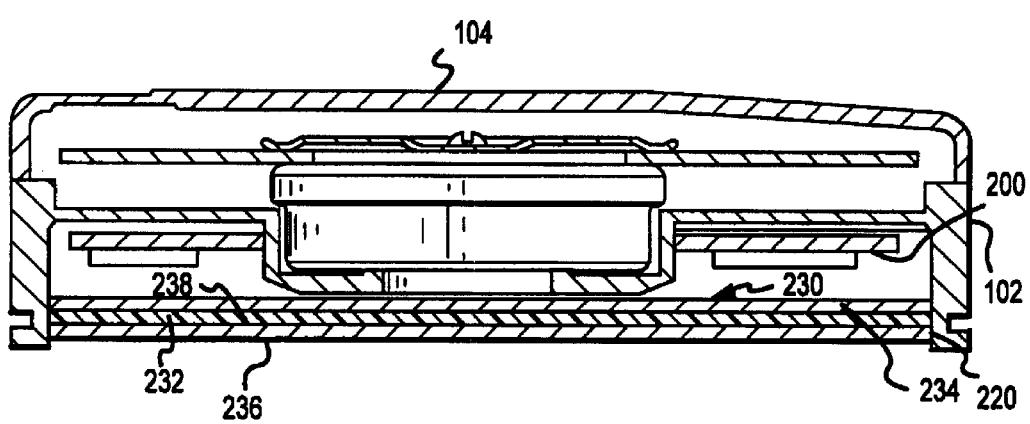

FIGS. 4 and 5 are cross-sectional views through the disc drive assembly taken along line 4—4 in FIG. 1 for the embodiments shown in FIGS. 2 and 3.

DETAILED DESCRIPTION OF THE PREFERRED EMBODIMENTS

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. This assembly is called a head disc assembly (HDA). The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 106 is typically de-energized when the disc drive 100 is not in use for extended periods of time. The heads 118 are moved over park zones 120 near the inner diameter of the discs 108 when the drive motor is de-energized as shown in FIG. 3. The heads 118 are secured over the park zones 120 through the use of an actuator latch arrangement 122, which prevents inadvertent rotation of the actuator arms 114 when the heads are parked.

The radial position of the heads 118 is controlled through the use of a voice coil motor (VCM) 124, which typically includes a coil 126 attached to the actuator assembly 110, as well as one or more permanent magnets and return plates 128 which are spaced apart and establish a vertical magnetic field between them in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, a perspective exploded view of the major components on the bottom of the disc drive assembly 100 is shown. The head disc assembly top cover 104 is shown attached to the disc drive base 102. The bottom surface of the spindle motor 106 extends through the disc drive base 102. A printed circuit board assembly (PCBA) 200 mounts to the bottom surface of the disc drive base. 102 in a conventional manner.

A protective cover 220 is fastened to the disc drive base 102 and extends over the PCBA 200 protecting it from handling and electrostatic damage. The protective cover 220 is a generally flat plate shaped body and is attached to the disc drive base 102 using attachment members 222 and 224, respectively. The attachment members 222 and 224 rest within a pair of attachment guide slots 223 and 225 on the side rails of the base plate 102. Each of the attachment members 222 and 224 has an aperture 221 that is capable of receiving a fastening member such as a screw that secures the protective cover 220 to the disc drive base 102. The protective cover 220 is also secured directly to the PCBA 200 using the retaining members 226 and 228. The retaining members 226 and 228 engage the rear edge portion 210 of the PCBA 200 to further stabilize the protective cover 220 on the disc drive assembly 100.

As shown in FIG. 2, a constrain layer 230 is affixed to the upper surface of the protective cover 220. The constrain layer 230 is made up of a stiffening member 234 and a damping member 232 that are sandwiched together. The stiffening member 234 is preferably made from a sheet material having a high mechanical stiffness. For example, the stiffening member 234 can be made a metal such as steel or a similar material having a high modulus of elasticity. Additionally, the stiffening member 234 has a thickness preferably between about 0.010 and about 0.030 inches. In one preferred embodiment, the stiffening member 234 has a nominal thickness of about 0.020 inches. On the other hand, the damping member 232 has a nominal thickness preferably between about 0.001 inches and about 0.005 inches. Preferably, the damping member 232 has a nominal thickness of about 0.002 inches. The damping member 232 is preferably made from a material having good damping properties. For example, the damping member 232 may include or may be a pressure sensitive adhesive layer enabling the constrain layer 230 to be affixed directly to a surface of the protective cover 220.

FIGS. 4 and 5 are cross-sectional views of the disc drive assembly 100 having a constrain layer 230 affixed to the protective cover 220. As shown in FIGS. 4 and 5, the protective cover 220 has a first side 236 facing away from the PCBA 200. Similarly, the protective cover 220 has a second side 238 facing the PCBA 200. In one embodiment of the invention, the constrain layer 230 is affixed to the first side 236 of the protective cover 220 as shown in FIG. 4. Moreover, the constrain layer 230 is sized to correspond to the surface shape of the first side 236 of the protective cover 220. Preferably, the damping member 232 is disposed between the stiffening member 234 and the protective cover 220. In this embodiment, the constrain layer 230 adds to the overall dimensions of the disc drive assembly 100. Therefore, in applications where the design tolerances are small, it may not be desirable to affix the constrain layer 230 to the first side 236 of the protective cover 220.

FIGS. 3 and 5 show an alternative embodiment of the disc drive assembly 100. In this embodiment, the constrain layer 230 is affixed to the second side 238 of the protective cover 220 facing the PCBA 200. The constrain layer 230 is sized to correspond to the surface shape of the second side 236 of the protective cover 220. Preferably, the damping member 232 is disposed between the stiffening member 234 and the protective cover 220. The addition of the constrain layer 230 to the second side of the protective cover 220 does not add to the overall dimensions of the disc drive assembly 100. Accordingly, a reduction in the acoustic emissions is achieved without effecting the external form factor of the disc drive assembly 100.

Still yet, in other applications, the addition of the constrain layer 230 to the second side 238 of the protective cover 220 may effect the dimensional tolerances between the PCBA 200 and the protective cover 220. For example, the distance between the electrical components 204–208 mounted on the PCBA 200 may be insufficient to permit the constrain layer 230 to be disposed between the protective cover 220 and the PCBA 200. In this case, the constrain layer 230 may be provided with a plurality of cutouts or recessed areas 209–213 that correspond to the location of the electrical components 204–208 mounted on the PCBA 200.

Accordingly, the constrain layer 230 may be closely disposed between the protective cover 220 and the PCBA 200 to minimize the acoustic emissions from the disc drive assembly 100 without effecting the dimension tolerances between the PCBA 200 and the protective cover 220.

Alternatively, the protective cover 220 may be provided with a constrain layer 230 on both the first side 236 and the second side 238. A still further embodiment of the constrain layer may be incorporated into the material of the protective cover 220 itself. The protective cover material may be formed or made of a laminate of damping material and constrain layer or may simply be made of a material having a high damping characteristic. Another alternative has the constrain layer 230 being a polymeric sheet material having a high damping characteristic. For example, the protective cover 220 may have a label sheet on its outer surface in which the label sheet is a thick plastic held in place by a pressure sensitive adhesive layer. Finally, the damping material may alternatively simply be a free coating on the cover 220 which imparts a high damping character to the cover 220.

In summary, a disc drive (such as 100) in accordance with the present invention has a base (such as 102), a circuit board (such as 200) mounted to the base (such as 102) and a protective cover (such as 220) fastened to the base (such as 102) and extending over the circuit board (such as 200). The protective cover such as 220) includes a damping member (such as 232) to reduce vibrational and acoustical energy produced by the cover during operation of the disc drive. The circuit board (such as 200) is disposed between the base (such as 102) and the protective cover (such as 220). The assembly further preferably comprises a constrain layer (such as 230) affixed to the protective cover (such as 220). The constrain layer (such as 230) has a stiffening member (such as 234) and a damping member (such as 232) sandwiched together. Accordingly, the stiffening member (such as 234) and the damping member (such as 232) reduce the vibrational and acoustical energy produced by the protective cover (such as 220) during operation of the disc drive (such as 100).

Furthermore, the protective cover (such as 220) is a generally flat plate shaped body having a first side (such as 236) facing away from the circuit board (such as 200). Similarly, the protective cover (such as 220) has a second side (such as 238) facing towards the circuit board (such as 200). The constrain layer (such as 230) is affixed to and substantially sized to correspond to the surface shape of the first side (such as 236) of the protective cover (such as 220) facing away from the circuit board (such as 200). Alternatively, the constrain layer (such as 230) is affixed to and substantially sized to correspond to the surface shape of the second side (such as 238) of the protective cover facing the circuit board.

The circuit board (such as 200) has electrical components (such as 204–208) mounted on a surface facing the protective cover (such as 220) and extending towards the protective cover (such as 220). Furthermore, the constrain layer (such as 230) may also include a recessed area (such as 209–213) that corresponds to the location of an electrical component (such as 204–208) mounted on the circuit board (such as 200).

In one embodiment of the invention, the stiffening member (such as 234) is made from a metal material. The thickness of the stiffening member (such as 234) has a nominal thickness between about 0.010 inches and about 0.030 inches. Moreover, the damping member (such as 232) includes a layer of pressure sensitive adhesive.

In yet another embodiment of the invention, a disc drive (such as 100) having a base (such as 102) supporting a drive motor (such as 106) carrying a data disc (such as 108) and an actuator assembly (such as 110) adjacent the data disc (such as 108) for reading and writing data to and from the data disc (such as 108) is provided. A hard disc assembly cover (such as 104) extends over the disc (such as 108) and the actuator assembly (such as 110) and is fastened to one side of the base (such as 102). A printed circuited board (such as 200) is fastened to the other side of the base for interfacing and controlling the actuator assembly (such as 110) and the drive motor (such as 106) attached to the base (such as 102).

The disc drive (such as 100) comprises an acoustically damped circuit board cover (such as 220) fastened to the base (such as 102) and extends over the printed circuit board (such as 200). The circuit board cover (such as 220) has a constrain layer (such as 230) affixed to the cover (such as 220). The constrain layer (such as 230) comprises a stiffening member (such as 234) and a damping member (such as 232) sandwiched together to reduce transmission of vibrational and acoustical energy produced during operation of the disc drive (such as 100).

The acoustically damped circuit board cover (such as 220) has a first side (such as 236) facing away from the circuit board (such as 200) and a second side (such as 238) facing towards the circuit board (such as 200). The constrain layer 25 (such as 230) is affixed to and sized to correspond to the surface shape of the first side (such as 236) of the cover facing away from the circuit board (such as 200). In an alternative embodiment of the invention, the constrain layer (such as 230) is affixed to and sized to correspond to the surface shape of the second side (such as 238) of the protective cover facing toward the circuit board (such as 200).

The damping member (such as 232) is disposed between the cover (such as 220) and the stiffening member (such as 234). The stiffening member (such as 234) is made from a metal material. The damping member (such as 232) includes a layer of pressure sensitive adhesive.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive having a base and a printed circuit board fastened to a bottom surface of the base, the disc drive comprising:

a protective cover directly fastened to the base and extending over the printed circuit board so that the printed circuit board is positioned between the base and the protective cover attached to the base; and means for constraining vibration of the protective cover during operation of the disc drive.

2. The disc drive of claim 1 wherein the protective cover has a first surface facing away from the printed circuit board and a second surface facing toward the printed circuit board when the protective cover is attached to the disc drive, and wherein the means for constraining vibration of the protective cover comprises a constrain layer attached to the first surface of the protective cover.

3. The disc drive of claim 1 wherein the protective cover has a first surface facing away from the printed circuit board and a second surface facing toward the printed circuit board when the protective cover is attached to the disc drive, and wherein the means for constraining vibration of the protective cover comprises a constrain layer attached to the second surface of the protective cover.

4. A disc drive having a base supporting a drive motor carrying a data disc and an actuator assembly for reading and writing data to and from the data disc, the disc drive further including a top cover engaging a top surface of the base to form an internal sealed environment surrounding the data disc and the actuator assembly, the disc drive comprising:
 a printed circuited board fastened to a bottom surface of the disc drive base, the printed circuit board including a plurality of electrical components mounted thereon for controlling the drive motor and the actuator assembly attached to the base;
 a protective cover attached to the disc drive base so that the printed circuit board is positioned between the disc drive base and the protective cover; and
 a constrain layer attached to a surface of the protective cover to reduce vibrational and acoustical energy produced by the protective cover during operation of the disc drive.

5. The disc drive of claim 4 wherein the protective cover has a first surface facing away from the printed circuit board and a second surface facing toward the printed circuit board, and wherein the constrain layer is attached to the first surface of the protective cover.

6. The disc drive of claim 5 wherein the constrain layer includes a stiffening member and a damping member sandwiched together so that the damping member contacts the first surface of the protective cover.

7. The disc drive of claim 6 wherein the stiffening member comprises a metal sheet having a nominal thickness between about 0.010 inches and about 0.030 so that the stiffening member substantially matches a shape and size of the first surface of the protective cover.

8. The disc drive of claim 7 wherein the damping member comprises a layer of pressure sensitive adhesive having a nominal thickness between about 0.001 inches and about 0.005 inches, wherein the pressure sensitive adhesive secures the stiffening member to the first surface of the protective cover.

9. The disc drive of claim 4 wherein the protective cover has a first surface facing away from the printed circuit board and a second surface facing toward the printed circuit board, and wherein the constrain layer is attached to the second surface of the protective cover.

10. The disc drive of claim 9, wherein the constrain layer includes a recessed area corresponding to a location of one of the electrical components mounted on the printed circuit board.

11. The disc drive of claim 9 wherein the constrain layer includes a stiffening member and a damping member sandwiched together so that the damping member contacts the second surface of the protective cover.

12. The disc drive of claim 11 wherein the stiffening member comprises a metal sheet having a nominal thickness between about 0.010 inches and about 0.030 so that the stiffening member substantially matches a shape and size of the second surface of the protective cover.

13. The disc drive of claim 12 wherein the damping member comprises a layer of pressure sensitive adhesive having a nominal thickness between about 0.001 inches and about 0.005 inches, wherein the pressure sensitive adhesive secures the stiffening member to the second surface of the protective cover.

14. A protective cover for a disc drive, wherein the disc drive includes a base and a printed circuited board fastened to a bottom surface of the base, the printed circuit board including a plurality of electrical components mounted thereon for controlling operation of the disc drive, the protective cover comprising:
 a substantially flat metal sheet adapted for attachment to the disc drive base so that the printed circuit board is positioned between the disc drive base and the substantially flat metal sheet; and
 a constrain layer attached to a surface of the substantially flat metal sheet to reduce vibrational and acoustical energy produced by the protective cover when the protective cover is attached to the operational disc drive.

15. The protective cover of claim 14 wherein the protective cover has a first surface facing away from the printed circuit board and a second surface facing toward the printed circuit board when the protective cover is attached to the disc drive, and wherein the constrain layer is attached to the first surface of the protective cover.

16. The protective cover of claim 15 wherein the constrain layer includes a stiffening member and a damping member sandwiched together so that the damping member contacts the first surface of the protective cover.

17. The protective cover of claim 14 wherein the protective cover has a first surface facing away from the printed circuit board and a second surface facing toward the printed circuit board when the protective cover is attached to the disc drive, and wherein the constrain layer is attached to the second surface of the protective cover.

18. The protective cover of claim 17, wherein the constrain layer includes a recessed area that corresponds to a location of one of the electrical components mounted on the printed circuit board.

19. The protective cover of claim 17 wherein the constrain layer includes a stiffening member and a damping member sandwiched together so that the damping member contacts the second surface of the protective cover.

* * * * *

UNITED STATES PATENT AND TRADEMARK OFFICE
CERTIFICATE OF CORRECTION

PATENT NO.     : 6,674,608 B1
DATED          : January 6, 2004
INVENTOR(S)    : Frank William Bernett It is certified that error appears in the above-identified patent and that said Letters Patent is hereby corrected as shown below:

<u>Title page,</u>
Insert item:
-- [73] Assignee, Seagate Technology LLC --.

<u>Column 1,</u>
Line 57, replace the word "accurate" with -- arcuate--.

<u>Column 6,</u>
Line 39, replace "constrain layer 25 (such as 230)" with -- constrain layer (such as 230) --.

Signed and Sealed this

Thirtieth Day of March, 2004

JON W. DUDAS
*Acting Director of the United States Patent and Trademark Office*